(12) United States Patent
Berger et al.

(10) Patent No.: US 7,104,599 B2
(45) Date of Patent: Sep. 12, 2006

(54) FOLDING TABLE FOR A SEAT IN A MEANS OF TRANSPORTATION

(75) Inventors: Georg Berger, Böttcher Strasse 20, D-46244 Bottrop (DE); Hans-Jörg Brandt, Dahlem (DE)

(73) Assignees: Georg Berger; E.I.S. Aircraft GmbH, (DE)

(*) Notice: Subject to any disclaimer, the term of this patent is extended or adjusted under 35 U.S.C. 154(b) by 20 days.

(21) Appl. No.: 10/434,486

(22) Filed: May 8, 2003

(65) Prior Publication Data

US 2003/0217673 A1 Nov. 27, 2003

(30) Foreign Application Priority Data

May 8, 2002 (DE) .......................... 202 07 355 U

(51) Int. Cl.
- A47B 83/02 (2006.01)
- A47B 37/00 (2006.01)
- A47B 13/16 (2006.01)
- A47B 3/14 (2006.01)
- A47B 5/04 (2006.01)
- A47C 7/62 (2006.01)
- G09F 7/12 (2006.01)
- G09F 3/18 (2006.01)

(52) U.S. Cl. ................. 297/163; 297/146; 297/188.04; 108/25; 108/42; 108/44; 108/90; 108/134; 108/152; 40/320; 40/593; 40/594; 40/661

(58) Field of Classification Search ............... 297/163, 297/146, 188.04; 108/25, 42, 44, 90, 152, 108/134; 40/320, 593, 594, 661
See application file for complete search history.

(56) References Cited

U.S. PATENT DOCUMENTS

| | | | |
|---|---|---|---|
| 5,004,252 A * | 4/1991 | Kraper | 108/42 X |
| 5,010,668 A | 4/1991 | Zeligson | 40/320 X |
| 5,720,515 A * | 2/1998 | Haffner | 297/188.04 |
| 6,116,167 A * | 9/2000 | Rabe | 108/90 |
| 6,240,667 B1 * | 6/2001 | Harney et al. | 108/90 X |
| 6,279,992 B1 * | 8/2001 | Plocher et al. | 297/146 |
| 6,592,179 B1 * | 7/2003 | Miyazaki | 297/146 |
| 6,739,654 B1 * | 5/2004 | Shen et al. | 297/188.04 |
| 2002/0043826 A1 * | 4/2002 | Ingram et al. | 297/146 |
| 2002/0047294 A1 * | 4/2002 | Ellinidis et al. | 297/188.04 |
| 2003/0019136 A1 * | 1/2003 | Whitman | 40/320 |
| 2005/0204596 A1 * | 9/2005 | Peng | 297/188.04 X |

* cited by examiner

*Primary Examiner*—Rodney B. White
(74) *Attorney, Agent, or Firm*—Ostrolenk, Faber, Gerb & Soffen, LLP

(57) ABSTRACT

A folding table for the rear of a backrest, the table having a surface with a depression therein in which a carrier for visible material, like an advertisement, is disposed. The carrier is received in an undercut in the depression. Alternatively, a frame around the edge of the carrier has projections received in grooves in the table for holding the frame and thereby the carrier to the surface.

20 Claims, 3 Drawing Sheets

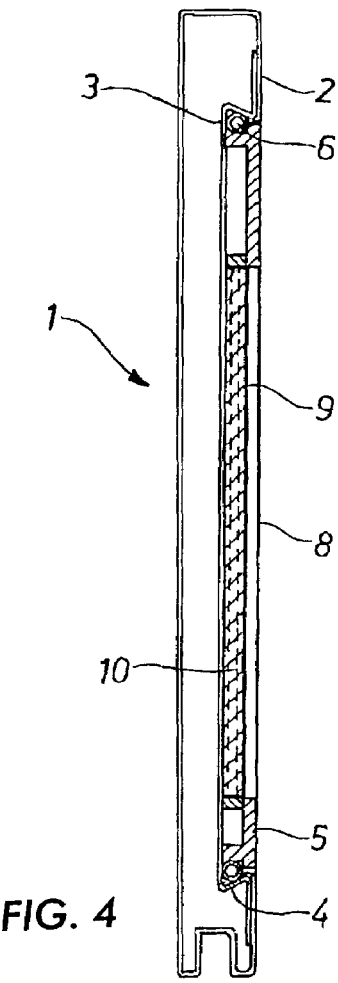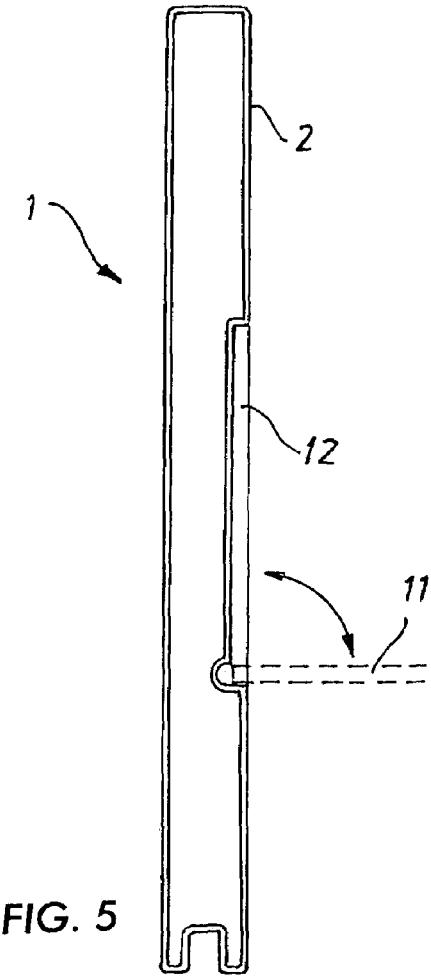
FIG. 4     FIG. 5
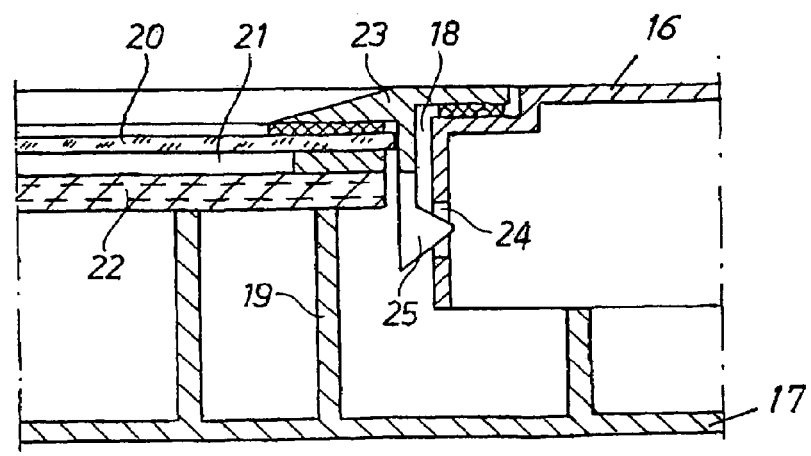
FIG. 6

FOLDING TABLE FOR A SEAT IN A MEANS OF TRANSPORTATION

BACKGROUND OF THE INVENTION

The invention relates to a folding table on the rear side of the backrest of a passenger seat in an aircraft, land vehicle or watercraft. It is possible for the folding table to be adjusted between an inoperative position, in which it is folded up against the backrest, and a folded-down use position. Its side which is visible in the inoperative position is designed as an advertisement-carrying surface for an exchangeable advertisement carrier.

Folding tables of this type are described in DE 43 40 189 A1, DE 297 01 389 U1 and DE 299 07 135 U1.

The folding table according to DE 299 07 135 U1 has a table top with a lower side containing a cutout in which a plate-like insert is removably mounted such that it can be removed, and which has an insertion compartment for holding an information carrier in the form of a sheet. The insertion compartment is covered toward the visible surface of the insert by a transparent window. The insert is designed as a frame, with the insertion compartment being open toward the opposite surface of the cutout of the table top. The insert is mounted in the cutout of the table top, in the vertical inoperative position thereof, in a manner such that it can be pulled out upward. A respective pivot pin, which engages in a respective lateral displacement groove of the cutout of the table top, protrudes in the lower region of the insert from both sides. In the upper region of the insert, a respective latching projection, which engages in the displacement groove, protrudes from both sides. The insert can be blocked in the cutout of the table top by at least one fixing element.

This folding table is of multi-part and complicated construction and does not provide sufficient security against unauthorized opening by removal of the insert from the cutout of the table top. The complicated construction also means that this folding table is relatively heavy, which is disadvantageous when it is used on an aircraft passenger seat.

SUMMARY OF THE INVENTION

An object of the invention is to provide a folding table which does not have the disadvantages of the prior art, is of simple construction, has a low weight and provides security against unauthorized manipulation of the advertisement-carrying surface.

For a folding table of the type mentioned above, it is proposed according to the invention, that side of the folding table which is designed as an advertisement-carrying surface has a depression with undercuts or grooves arranged at least in some regions. An insert which holds the advertisement carrier and is adapted to the depression, or a frame which engages around the insert and over it in the edge region, may be clipped into the depression by projections which grip behind the undercut or engage in the groove.

The undercut or the groove can be made in the depression while the folding table is being produced, while the insert or the frame either has a plurality of latching lugs on its circumference, which lugs grip behind the undercut or groove, in which case a plurality of undercut sections or groove sections corresponding to the latching lugs can be arranged on the circumference of the depression, or else there is an encircling, groove-like depression into which an elastic shaped ring is placed, wherein the ring forms the projection which grips behind the encircling undercut or engages in the encircling groove.

When the frame is clipped into the depression in the described manner, it can only be removed from the depression using a special tool which is not available to the passenger.

Since the frame does not have any guides, projections sliding in the guides, and the like, it can be designed to be very narrow and with a low weight. The elastic shaped ring can preferably comprise a round seal which is placed into the encircling, groove-like depression of the insert and is held therein on account of its elasticity. This round seal can be deformed to a sufficient extent in order to ensure that the frame is clipped into the depression and that the frame is subsequently secured in the encircling undercut of the depression. At the same time, a sealing effect with respect to cleaning agents is produced.

The insert may be provided with a transparent visible surface behind which the advertisement carrier may be arranged. The advertisement-carrying surface can also be designed as a viewing screen which can then show not only advertising messages, but also feature films and news.

A bottle or cup holder which can be folded down can be arranged next to the advertisement-carrying surface. As a result, drinks can be held ready while viewing the advertising message or a feature film.

The folding table is preferably designed as a film-encased foam or honeycomb body having receiving rails placed in and fixed on the lateral edges. This results in a light and nevertheless stable construction which has an impact-protecting function.

It is similarly possible to clip together the folding table, which comprises two injection-molded plastic half shells, to form a unit.

Other objects and features of the invention are explained below with reference to an exemplary embodiment illustrated in the drawings.

BRIEF DESCRIPTION OF THE DRAWINGS

FIG. 4 shows a section along the line B—B in FIG. 1, and FIG. 5 shows a section along the line C—C in FIG. 1, FIG. 6 shows a partial sectional view of a second embodiment of the arrangement of the advertisement carrier in the folding table.

DESCRIPTION OF PREFERRED EMBODIMENTS OF THE INVENTION

Figure 1:
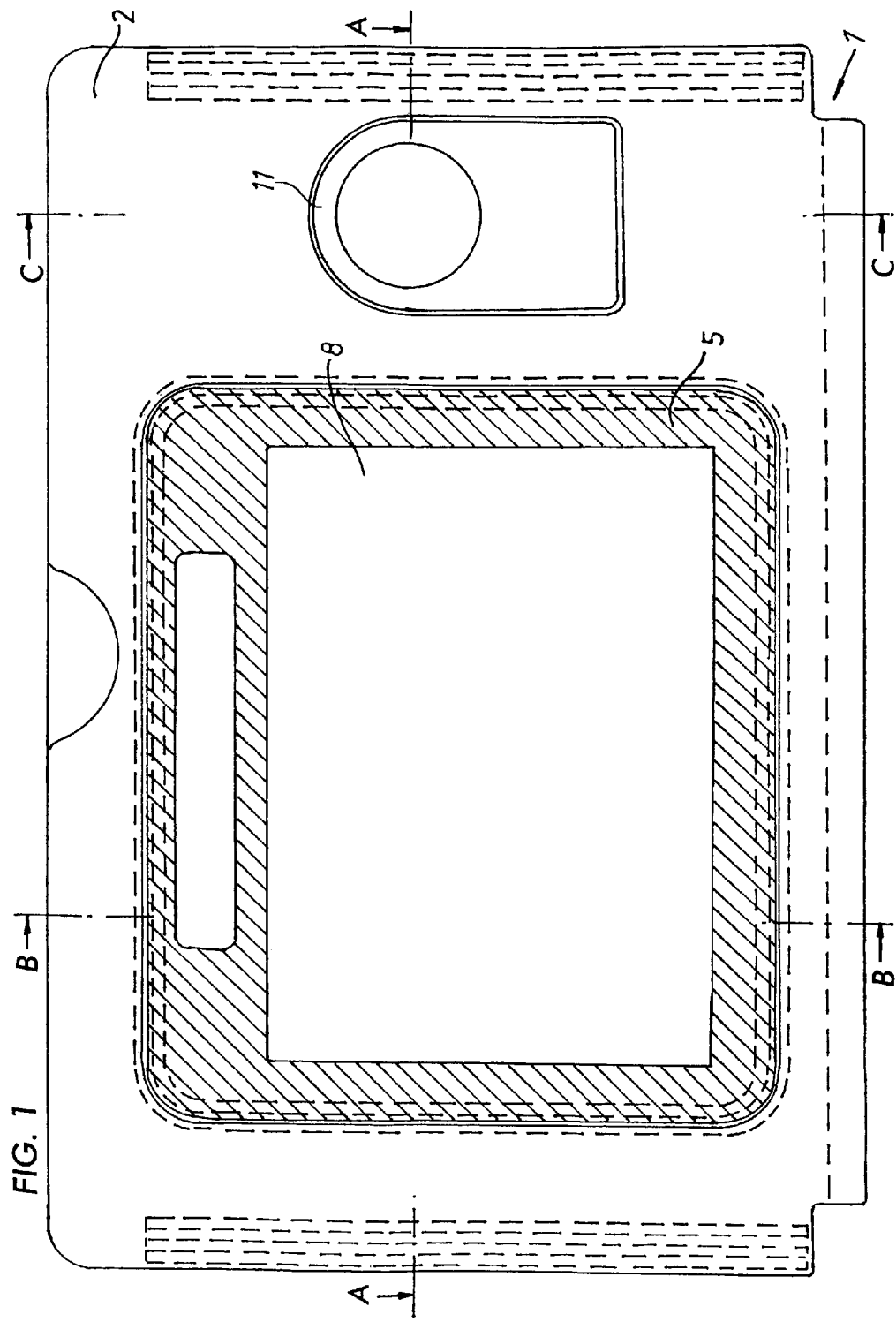
FIG. 1 shows a plan view of that side of an airplane folding table which is provided with the advertisement-carrying surface.
Figure 2:
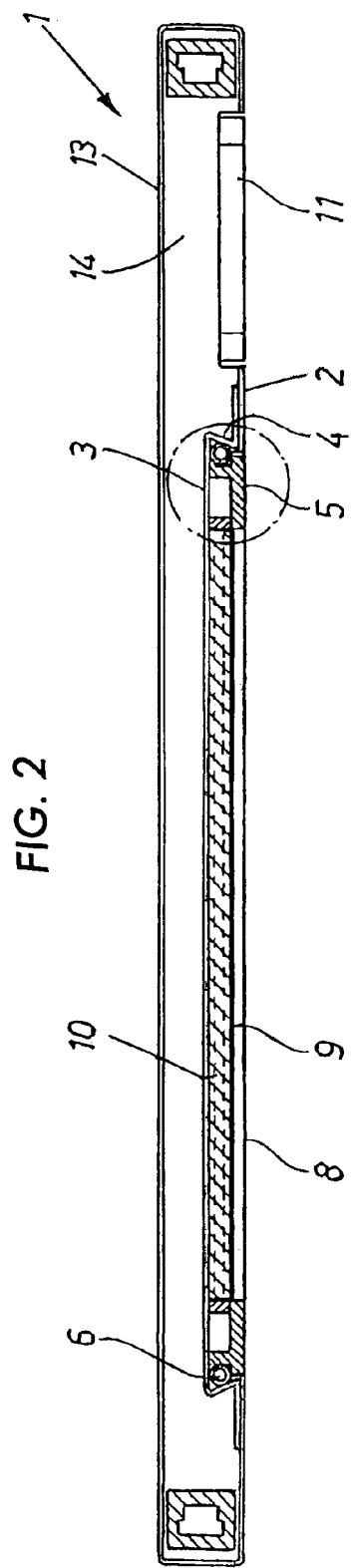
FIG. 2 shows a section along the line A—A in FIG. 1.
Figure 3:
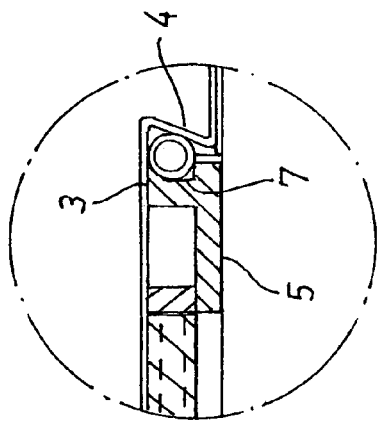
FIG. 3 shows an enlargement of part of FIG. 2.

A folding table 1 according to the invention is arranged on the rear side of the backrest of a passenger seat in an aircraft, land vehicle or watercraft. The table can be adjusted between an inoperative position, in which it is folded up against the backrest, and a folded-down use position. The table is illustrated in FIG. 1 with its visible side 2 in the inoperative position. The side 2 is provided with a first, undercut depression 3, including an encircling undercut 4 seen in FIGS. 2 to 4.

An insert 5, which is adapted to the shape of the depression 3, is provided with an encircling, groove-like depression 7. An elastic shaped ring, for example in the form of a sealing tube, can be placed in the groove 7. The shaped ring forms an encircling projection 6. It grips behind the encircling undercut 4 when the insert is in the clipped-in position illustrated. The insert 5 has a transparent visible surface 8 which defines the advertisement-carrying surface. The region of the hatching shows a structure which cannot be looked through and covers the edge of an advertisement carrier 9, and the fastening region is placed on or integrated with that structure. The advertisement carrier 9 comprises a printed film or other material arranged behind the visible surface 8. A foam underlayer 10 keeps the advertisement carrier 9 securely pressed against the rear side of the visible surface 8 in the clipped-in state.

A further depression 12, into which a bottle or cup holder 11 can be folded, is arranged next to the depression 3 in the visible side 2 of the folding table 1.

The folding table 1 comprises a foam body 14 which is foamed into a film 13, which consists of two structural shells and is bonded to supporting material.

Stiffening rails 15, preferably comprised of aluminum, are foamed in along the lateral edges of the folding table 1, and the fastening elements for the folding table 1, for fastening it to the backrest of the passenger seat, are fitted on said rails.

The frame 5 together with the advertisement carrier 9 and the foam underlayer 10 can be clipped into the depression 3. The shaped ring 6 is initially deformed and is then expanded in such a manner that it grips behind the encircling undercut 4 and secures the entire arrangement in a rattle-free manner. The foam underlayer 10 and the design of the folding table 1 as a foam body 14 provide increased accident protection on account of the shock-absorbing properties of the folding table 1.

The component comprising the frame 5, the visible surface 8, the advertisement carrier 9 placed in it and the foam underlayer 10 cannot be removed from the depression 3 without a special tool, since no handle is provided for this purpose. On the other hand, a flat lever, if appropriate a screwdriver, can be introduced into the gap between the frame 5 and the encircling undercut 4, and the frame 5 can therefore be levered out in a simple manner.

Two positions which each define an optimum lever arm with respect to the axis of rotation which arises are selected for the introduction of the tool. The engagement points are designed in such a manner that the groove for receiving the sealing and fixing profile makes the clearance possible by pushing said profile away into the expanded groove.

In the embodiment illustrated in FIG. 6, the folding table 1 comprises two plastic half shells 16, 17 which are clipped together. The upper plastic half shell 16 has a recess which, in conjunction with supporting ribs 19 on the lower plastic half shell, forms the depression 18 for holding the advertisement carrier. In the present case, a foam underlayer 22 is first placed onto the supporting ribs 19, a picture 21 used as the advertisement carrier is placed onto it and is covered in turn by a pane of glass 20 placed on it. The entire arrangement of the pane of glass 20, the picture 21 and the foam underlayer 22 is held in the depression 18 by an encircling frame 23. The frame 23 grasps the pane of glass 20 by engaging around it and, in the edge region, over it, and secures the pane by latching lugs 25 which project into the depression 18 and engage in groove sections 24.

This arrangement can also only be removed from the folding table by a special tool which can consist of the already mentioned, flat lever or of a suction head acting on the pane of glass 20.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A folding table for the rear of a backrest of a seat comprising:
    a table portion having a rear side which is exposed to view when the table is folded against the backrest;
    the rear side of the table portion having a depression therein, the periphery of which is undercut along at least a portion thereof;
    a carrier for a visible object engageably received in the depression;
    the periphery of the carrier being adapted to the shape of the depression and to grip releasably behind the undercut periphery whereby the carrier is removably retained in the depression; and
    a connection between the folding table and the backrest, the connection enabling the table to be moved between a folded position in which the carrier is visible and an unfolded position off the backrest;
    wherein the table portion is comprised of a film encased foam layer having lateral edges; and stiffening rails formed into the lateral edges of the foam layer.

2. A folding table for the rear of the backrest of a seat comprising:
    a table portion having a rear side which is exposed to view when the table is folded against the backrest;
    the rear side of the table portion having a depression therein, the periphery of which is undercut along at least a portion thereof;
    a carrier for a visible object engageably received in the depression;
    the periphery of the carrier being adapted to the shape of the depression and to grip releasably behind the undercut periphery whereby the carrier is removably retained in the depression; and
    a connection between the folding table and the backrest, the connection enabling the table to be moved between a folded position in which the carrier is visible and an unfolded position off the backrest;
    wherein the table portion comprises two injection molded plastic material half shells which are clipped together, with one of the shells being at the carrying surface which is on the side of the table which faces outwardly with the table folded up.

3. A folding table for the rear of the backrest of a seat, comprising:
    a rear portion visible when the table is folded against the backrest;
    a depression formed in the rear portion:
    a carrier for a visible object received in the depression:
    the carrier including a carrying surface adapted to support the visible object;
    the periphery of the carrier being adapted to the shape of the depression and engageable into the depression;
    grooves defined at regions in the rear portion of the table;
    a frame separate from the carrying surface which is shaped and positioned to engage around the carrier and to engage over at least part of an edge region of the carrier; and
    projections from the frame which engage in the grooves for holding the frame and thereby for holding the carrier in the depression;
    wherein the projections comprise a plurality of latching lugs on the periphery of the carrier, the lugs being shaped and positioned for engaging in the grooves.

4. The folding table of claim 3, wherein the grooves correspond in position to respective ones of the latching lugs and are arranged on the periphery of the depression.

5. The folding table of claim 3, wherein the carrier includes a transparent visible surface behind which an advertising carrier may be removably positioned.

6. The folding table of claim 5, further comprising an encircling opaque edge around the transparent visible surface.

7. The folding table of claim 3, wherein the visible object comprises a viewable image screen.

8. The folding table of claim 3, further comprising a bottle or cup holder arranged next to the carrier and separately foldable downward from the seat back or upward toward the seat back.

9. A folding table for placement on the rear side of a backrest of a passenger seat in a vehicle, comprising:
a connection between the folding table and the rear side of the backrest for enabling the folding table to be moved between an inoperative position folded up against the backrest and an operative folded down use position;
the folding table having a side visible when the folding table is in the inoperative position;
the visible side of the table having a depression therein with undercuts or grooves arranged in at least some regions of the depression;
a carrier for visible material, the carrier being adapted in shape and size to the depression for being received therein and for holding the carrier in the depression, the depression having a periphery with an undercut therein and the carrier being shaped for fitting into the undercut, and further comprising a groove around the carrier and an elastic, shaped ring disposed in the groove, the shaped ring being formed to extend into the undercut and grip behind the undercut.

10. A folding table for the rear of the backrest of a seat comprising:
a table portion having a rear side which is exposed to view when the table is folded against the backrest;
the rear side of the table portion having a depression therein, the periphery of which is undercut along at least a portion thereof, wherein the undercut extends around the periphery of the depression;
a carrier for a visible object engageably received in the depression;
the periphery of the carrier being adapted to the shape of the depression and to grip releasably behind the undercut periphery whereby the carrier is removably retained in the depression,
wherein
the carrier includes an encircling peripheral recess and an elastic, shaped ring disposed in the encircling recess depression and defining a projection of the carrier which grips in the undercut periphery of the depression; and
a connection between the folding table and the backrest, the connection enabling the table to be moved between a folded position in which the carrier is visible and an unfolded position off the backrest.

11. The folding table of claim 10, wherein the elastic, shaped ring comprises a tubular seal.

12. The folding table of claim 10, wherein the carrier includes a transparent visible surface behind which an advertising display may be removably positioned.

13. The folding table of claim 10, wherein the visible object comprises a viewable image screen.

14. The folding table of claim 10, further comprising a bottle or cup holder arranged next to the carrier and separately foldable downward from the seat back or upward toward the seat back.

15. The folding table of claim 10, wherein the fit of the carrier in the undercut portion of the periphery of the depression is such that a tool is required to remove the carrier.

16. The folding table of claim 3, wherein the fit of the frame in the depression is such that a tool is required to release the projections from the grooves.

17. A folding table for placement on the rear side of a backrest of a passenger seat in a vehicle, comprising
a table portion;
a connection between the table portion and the backrest for enabling the folding table to be moved between a stowed position in which it is folded against the backrest and an extended position away from the backrest;
the table portion having a rear side visible when it is in the stowed up position;
the rear side of the table portion having a depression therein;
a carrier for visible material;
the carrier being adapted in shape and size to be received in the depression; and
a retaining structure which removably secures the carrier in the depression;
the retaining structure being comprised of a first portion on the carrier which releasably engages with a complementary second portion on the depression;
wherein:
the first portion of the retaining structure is comprised of a groove around the periphery of the carrier and an elastic, shaped ring disposed in the groove; and
the shaped ring engages with the undercut portion and wherein
the complementary second portion of the retaining structure comprises an undercut region of the periphery of the depression.

18. The folding table of claim 17, wherein the fit of the carrier in the depression is such that a tool is required to release the first portion of the retaining structure from the complementary second portion.

19. A folding table for placement on the rear side of a backrest of a passenger seat in a vehicle, comprising
a table portion;
a connection between the table portion and the backrest for enabling the folding table to be moved between a stowed position in which it is folded against the backrest and an extended position away from the backrest;
the table portion having a rear side visible when it is in the stowed up position;
the rear side of the table portion having a depression therein;
a carrier for visible material;
the carrier being adapted in shape and size to be received in the depression; and
a retaining structure which removably secures the carrier in the depression;
the retaining structure being comprised of a first portion on the carrier which releasably engages with a complementary second portion on the depression;
wherein:
the first portion of the retaining structure is comprised of a groove around the periphery of the carrier and an elastic, shaped ring disposed in the groove; and the shaped ring engages with the complementary retaining portion.

20. The folding table of claim 19, wherein the fit of the carrier in the depression is such that a tool is required to release the first portion of the retaining structure from the complementary second portion.

* * * * *